(12) United States Patent
Tham

(10) Patent No.: US 11,681,365 B2
(45) Date of Patent: *Jun. 20, 2023

(54) POWER MANAGEMENT FOR DISPLAY SYSTEMS

(71) Applicant: Snap Inc., Santa Monica, CA (US)

(72) Inventor: Yu Jiang Tham, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,020

(22) Filed: Sep. 13, 2021

(65) Prior Publication Data

US 2021/0405747 A1 Dec. 30, 2021

Related U.S. Application Data

(63) Continuation of application No. 16/142,975, filed on Sep. 26, 2018, now Pat. No. 11,157,076.

(60) Provisional application No. 62/594,376, filed on Dec. 4, 2017.

(51) Int. Cl.
*G06F 3/01* (2006.01)
*G09G 3/20* (2006.01)

(52) U.S. Cl.
CPC ......... *G06F 3/013* (2013.01); *G09G 3/2092* (2013.01); *G09G 2320/0626* (2013.01); *G09G 2330/021* (2013.01); *G09G 2354/00* (2013.01)

(58) Field of Classification Search
CPC .......... G06F 3/013; G09G 3/2092; G09G 2320/0626; G09G 2330/021; G09G 2354/00
See application file for complete search history.

(56) References Cited

U.S. PATENT DOCUMENTS

| | | | |
|---|---|---|---|
| 9,830,708 B1 | 11/2017 | Poliakov | |
| 11,157,076 B1 | 10/2021 | Tham | |
| 2011/0150334 A1* | 6/2011 | Du | G06V 40/19 382/173 |
| 2014/0145914 A1* | 5/2014 | Latta | G06F 3/013 345/8 |
| 2018/0008141 A1 | 1/2018 | Krueger | |

OTHER PUBLICATIONS

"U.S. Appl. No. 16/142,975, Examiner Interview Summary dated Feb. 26, 2020", 3 pgs.
"U.S. Appl. No. 16/142,975, Examiner Interview Summary dated Apr. 27, 2021", 2 pgs.
"U.S. Appl. No. 16/142,975, Examiner Interview Summary dated Jun. 1, 2020", 3 pgs.

(Continued)

*Primary Examiner* — Deeprose Subedi
(74) *Attorney, Agent, or Firm* — Schwegman Lundberg & Woessner, P.A.

(57) ABSTRACT

A display system is disclosed. The display system includes a display, an eye-tracking sensor, and a processor communicatively coupled to the display and the eye-tracking sensor. The computing device receives data from the eye-tracking sensor, determines, based on the eye-tracking data, whether a user's eye is looking at a display in the display system, and based on whether the eye is determined to be looking at the display, controls a power consumption of the display.

20 Claims, 8 Drawing Sheets

(56) References Cited

OTHER PUBLICATIONS

"U.S. Appl. No. 16/142,975, Final Office Action dated Mar. 18, 2020", 11 pgs.
"U.S. Appl. No. 16/142,975, Non Final Office Action dated Feb. 16, 2021", 14 pgs.
"U.S. Appl. No. 16/142,975, Non Final Office Action dated Nov. 27, 2019", 11 pgs.
"U.S. Appl. No. 16/142,975, Notice of Allowance dated Jun. 30, 2021", 8 pgs.
"U.S. Appl. No. 16/142,975, Response filed Feb. 25, 2020 to Non Final Office Action dated Nov. 27, 2019", 12 pgs.
"U.S. Appl. No. 16/142,975, Response filed Jun. 16, 2021 to Non Final Office Action dated Feb. 16, 2021", 9 pages.
"U.S. Appl. No. 16/142,975, Response filed Sep. 18, 2020 to Final Office Action dated Mar. 18, 2020", 12 pgs.

* cited by examiner

POWER MANAGEMENT FOR DISPLAY SYSTEMS

PRIORITY

This application is a continuation of and claims the benefit of priority of U.S. patent application Ser. No. 16/142,975, filed on Sep. 26, 2018, which claims the benefit of priority of U.S. Patent Application Ser. No. 62/594,376, filed on Dec. 4, 2017, each of which are hereby incorporated by reference herein in their entireties.

BACKGROUND

Electronic displays often draw and consume a disproportionate amount of power in systems of which the display forms part. This can be particularly problematic in systems or devices in which power is at a premium, for example in battery-powered devices. For example, a near-eye display system in a headset (e.g., for a virtual reality display) or an eyewear device (e.g., for a mixed reality or augmented reality display) can oftentimes consume a large amount of power relative to other system components.

BRIEF DESCRIPTION OF THE FIGURES

The above-mentioned and other features and advantages of this disclosure, and the manner of attaining them, will become more apparent and the disclosure itself will be better understood by reference to the following description of examples taken in conjunction with the accompanying drawings, wherein.

Corresponding reference characters indicate corresponding parts throughout the several views. The exemplifications set out herein illustrate examples of the disclosure, and such exemplifications are not to be construed as limiting the scope of the disclosure any manner.

DETAILED DESCRIPTION

In describing the examples of the disclosure illustrated and to be described with respect to the drawings, specific terminology will be used for the sake of clarity. However, the disclosure is not intended to be limited to any specific terms used herein, and it is to be understood that each specific term includes all technical equivalents.

The present disclosure is directed to power management mechanisms and methods used in display systems. In an example, the power management mechanisms and methods can be used with a near-eye display (NED) system, or any other head-mounted display system.

Figure 1:
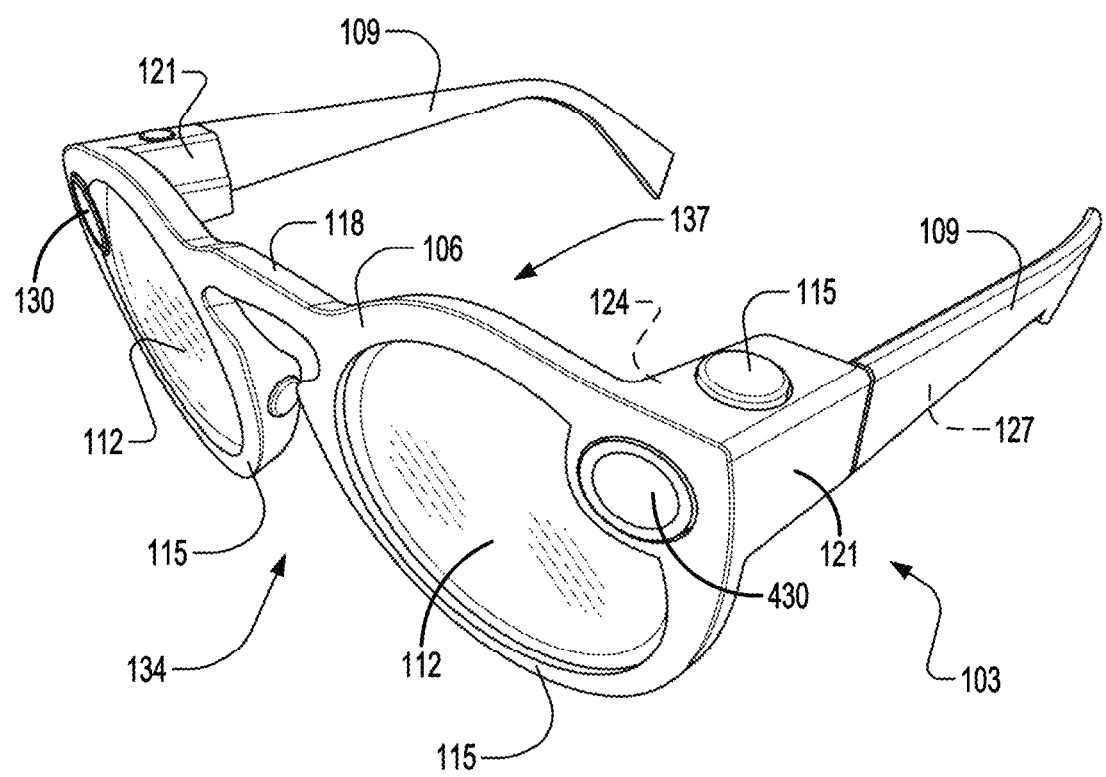
FIG. 1 is a perspective view of a near-eye display (NED) system, according to an example of the disclosure.

FIG. 1 illustrates a front perspective view of an eyewear device in the form of a pair of smart glasses 100, which can constitute a NED. NED 100 can include an integrated photo capture indication system, according to an example embodiment, and a display (e.g., a waveguide). NED 100 can include a body 103 comprising a front piece or frame 106 and a pair of temples 109 connected to frame 106 for supporting frame 106 in position on a user's face when NED 100 is worn. Frame 106 can be made from any suitable material such as plastics or metal, including any suitable shape-memory alloy.

NED 100 can have a pair of optical elements in the form of a pair of lenses 112 held by corresponding optical element holders in the form of a pair of rims 115 forming part of frame 106. Rims 115 of frame 106 can be connected by a bridge 118. In other embodiments, of one or both of the optical elements can be a display, a display assembly, or a lens and display combination. For instance, in an example, lenses 112 can incorporate a display (e.g., a waveguide) as a display mechanism, or lenses 112 can themselves be a display (e.g., a waveguide).

Frame 106 can include a pair of end pieces 121 defining lateral end portions of frame 106. In this example, a variety of electronics components can be housed in one or both of end pieces 121, as discussed in more detail below. In an example, an optical engine can be disposed within one or both of end pieces 121. The optical engine can include a micro display and imaging optics, which can be in the form of a collimator or collimating lens. The optical engine can also include a processor(s) configured to generate an image for the micro display. The micro display can be any type of light or image source (e.g., a projector), including but not limited to a liquid crystal display (LCD), one or more light emitting diodes (LEDs) in the form of a display (LED display), a liquid crystal on silicon (LCoS) display or projector, or any other suitable display or projector. The display can be driven by circuitry.

Temples 109 can be coupled to the respective end pieces 121. In this example, temples 109 can be coupled to frame 106 by respective hinges so as to be hingedly movable between a wearable mode (as shown in FIG. 1) and a collapsed mode in which temples 109 are pivoted towards frame 106 to lie substantially flat against it. In other examples, temples 109 can be coupled to frame 106 by any suitable means, or can be rigidly or fixedly secured to frame 106 so as to be integral therewith. Each of temples 109 can include a front portion that is coupled to frame 106 and any suitable rear portion for coupling to the ear of the user.

NED 100 can have onboard electronics components including a computing device, such as a computer 124, which can in different embodiments be of any suitable type so as to be carried by body 103. In some examples, computer 124 can be at least partially housed in one or both of the temples 109. In the present example, various components of computer 124 can be housed in lateral end pieces 121 of frame 106. Computer 124 can include one or more processors with memory, wireless communication circuitry, and a power source. Computer 124 can comprise low-power circuitry, high-speed circuitry, and, in some embodiments, a display processor(s). Various examples can include these elements in different configurations or integrated together in different ways.

Computer 124 can additionally include a battery 127 or other suitable portable power supply. In an example, battery 127 can be disposed in one of temples 109. In NED 100 shown in FIG. 1, battery 127 is shown as being disposed in one of end pieces 121, being electrically coupled to the remainder of computer 124 housed in the corresponding end piece 121.

NED 100 can also be camera-enabled. In an example, NED 100 can comprise one or more (e.g., a plurality) of cameras 130 mounted in one of end pieces 121. Each camera 130 can face forwards so as to be aligned more or less with the direction of view of a wearer of glasses 100. Camera 130 can be configured to capture digital images (also referred to herein as digital photographs or pictures), as well as digital video content. Operation of camera 130 can be controlled by a camera controller provided by computer 124, image data representative of images or video captured by the camera 130 being temporarily stored on a memory forming part of computer 124. Although cameras 130 are depicted as forward-facing cameras in FIG. 1, as explained below, it is also contemplated that any of cameras 130 or even additional cameras can be positioned on NED 100 so as to face the eyes of a user. Indeed, as set forth below, a camera or multiple cameras can be mounted in one of end pieces 121 or at another location on NED 100 so as to face a user's eyes (e.g., for eye-tracking purposes).

NED 100 can additionally include one or more (e.g., a plurality) of eye-tracking sensors (not shown). As alluded to above, the eye-tracking sensor(s) can be a camera, in an example. NED 100 can further include mechanisms and methods for detecting the gaze of a user's eyes and determining the position of a user's eyes when using NED 100. Such eye-tracking can be used, inter alia, for power management of NED 100 as detailed more fully below. A single example of an eye-tracking and detection mechanism is set forth below, it being understood that other eye-tracking and detection mechanisms and methods can be used with the devices and methods of the disclosure.

Eye-Tracking

Figure 2:
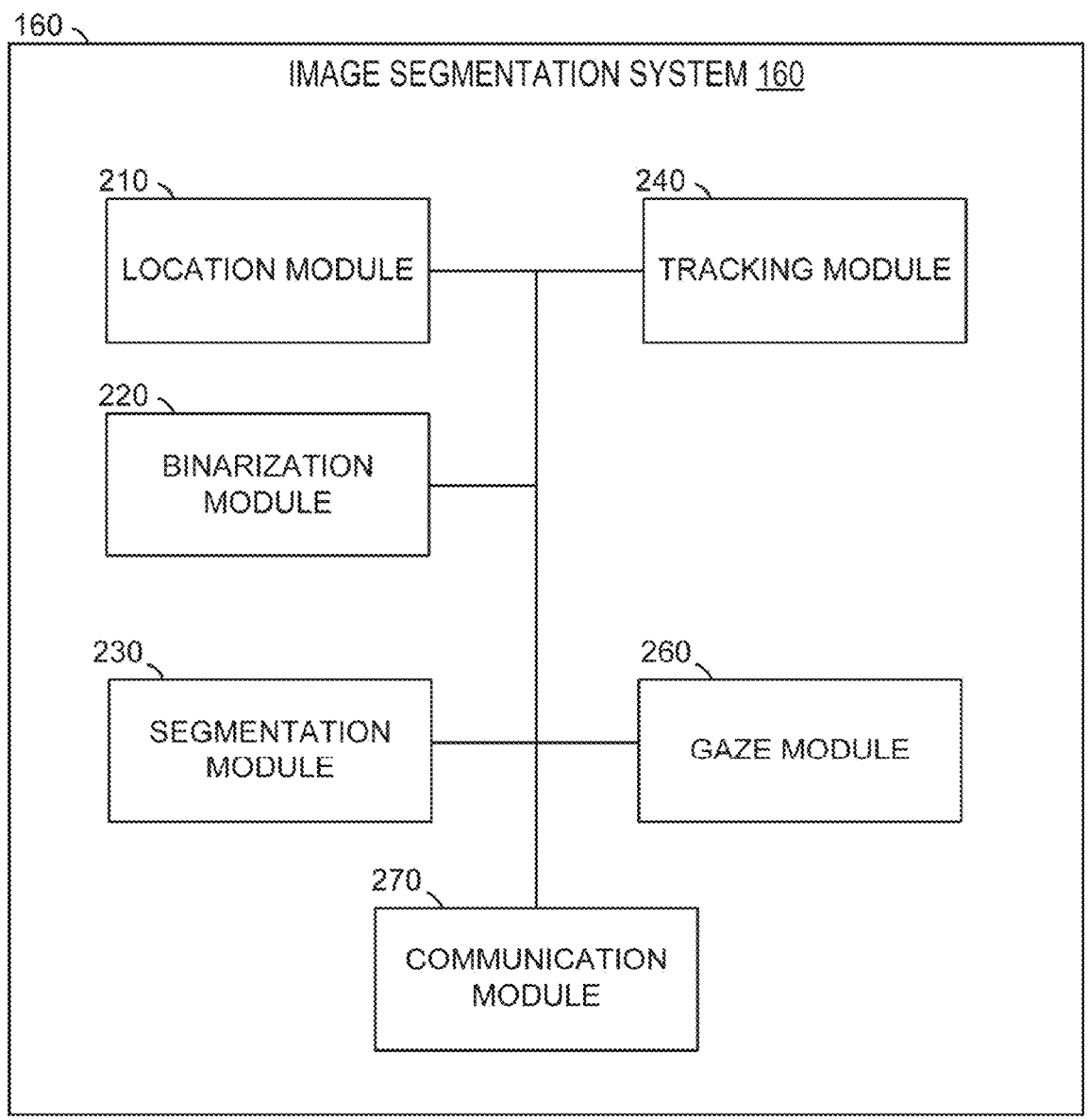
FIG. 2 is a diagram illustrating an image segmentation system, according to some example embodiments.

In FIG. 2, in various embodiments, an image segmentation system 160 can be implemented as a standalone system or implemented in conjunction with a client device (e.g., NED 100) or application. Image segmentation system 160 is shown to include a location module 210, a binarization module 220, a segmentation module 230, a tracking module 240, a gaze module 260, and a communication module 270. All, or some, of modules 210-270, communicate with each other, for example, via a network coupling, shared memory, and the like. Each module of modules 210-270 can be implemented as a single module, combined into other modules, or further subdivided into multiple modules. Other modules not pertinent to example embodiments can also be included, but are not shown. While not shown in FIG. 2, in some embodiments, one or more processors can control the operations of the modules 210-270 in image segmentation system 160. For example, in the one embodiment, the image segmentation system 160 is a standalone system that further includes a processor and memory (not shown). The processor can execute instructions stored in the memory that cause the processor to perform or control the operations of the modules 210-270. In another embodiment, the image segmentation system 160 is implemented in conjunction with the NED 100 in FIG. 1. In this embodiment, the processor included in computer 124 in the NED 100 can perform or control the operations of the modules 210-270.

Location module 210 can perform locating operations within image segmentation system 160. In various example embodiments, location module 210 can identify and provide locations for an object of interest depicted by images of a video stream (e.g., one or more frames of a video stream). The video stream can be a video stream sourced from NED 100 (e.g., the eye-facing camera(s) thereof). In some embodiments, location module 210 can be a portion of a face-tracking module or system. In some instances, where an object of interest is a portion of a face (e.g., an eye(s)), location module 210 can identify a location of a face depicted in one or more images within a video stream and one or more facial features depicted on the face. For example, where location module 210 is configured to locate an iris of an eye, location module 210 can identify a face depicted within an image, identify an eye on the face, and identify an iris within the eye.

In at least some embodiments, location module 210 can locate an area of interest within the one or more images, which contains the object of interest, face, or facial feature. For example, the area of interest identified by location module 210 can be a portion of the image, such as a rectangle in which the object of interest appears. Although referenced as a rectangle, the area of interest may be any suitable shape or combination of shapes. For example, the area of interest may be represented as a circular shape, a polygonal shape, or an outline shaped and sized similarly to and including the object of interest (e.g., an outline of an eye(s)).

In some embodiments, location module 210 can perform cropping functions. For example, after determining an area of interest within an image, location module 210 can crop the image, removing from consideration areas outside of the area of interest. In some instances, after cropping, the area of interest can be processed by one or more other modules of image segmentation system 160. Where processed by other modules, location module 210, alone or with cooperation of communication module 270, can transfer the cropped area of interest to one or more other modules (e.g., the binarization module 220).

Binarization module 220 can perform binarization functions for one or more of the area of interest identified by location module 210 and the one or more images of the video stream. Binarization module 220 can convert the area of interest or one or more images of the video stream to a binary image, where each pixel has one of two values. In some embodiments, as described below, the binary image produced by binarization module 220 can contain two possible values, zero or one, for any pixel within the binarized image. Binarization module 220 can convert the area of interest or the one or more images of the video to represent the depicted object of interest as a contrasting color image. For example, the pixels in the binarized image may be converted to representing only black (e.g., a value of one) and white (e.g., a value of zero). Once binarized, binarization module 220 can transmit or otherwise pass the binarized image to one or more additional modules of image segmentation system 160. For example, binarization module 220, alone or in cooperation with communication module 270, can pass the binarized image to segmentation module 230.

Although described in the present disclosure as a contrasting image composed of black and white pixels, binarization module 220 can convert the area of interest or the one or more images of the video stream to any two contrasting colors (e.g., red vs. blue). In some embodiments, binarization module 220 binarizes the area of interest or the one or more images using a red channel of the pixels of the area of interest or the one or more images. In some instances, binarization module 220 can dynamically adjust the channel or luminance used for binarization based on one or more colors identified by location module 210 within the area of interest or the one or more images. For example, where binarizing an area of interest of an iris of a blue eye, binarization module 220 can binarize the area of interest using the red channel of the pixels.

Segmentation module 230 can perform segmentation functions within the one or more images of the video stream. In some embodiments, segmentation module 230 can perform segmentation functions on the area of interest within one or more images. In performing the segmentation functions, segmentation module 230 may identify sub-sections or portions of the object of interest within the area of interest. For example, segmentation module 230 may identify a pupil and an iris within an eye depicted in the area of interest. After identifying a portion of the object of interest, segmentation module 230 may determine distances, areas, percentages, and proportions for that object of interest for further processing or functions of the modules of image segmentation system 160. For example, in the instance of an eye being the object of interest, segmentation module 230 can identify the pupil and iris within the eye. Segmentation module 230 may then determine an initial pupil location, an initial iris radius, a total width of an eye, and distances from each corner of the eye to a point on the iris nearest to each corner of the eye. Segmentation module 230 may then determine a final pupil location and a final iris radius based on the initial pupil location, the initial iris radius, and one or more additional measurement or determination.

In some instances, after identifying the portion of the object of interest within the area of interest and performing one or more measurements or determinations thereon, segmentation module 230, alone or in combination with communication module 270, can pass the area of interest and data, representative of the one or more measurement or one or more determination, to one or more additional modules of image segmentation system 160. For example, segmentation module 230 may pass the area of interest or data representative of the measurements and determinations of segmentation module 230 to tracking module 240, or gaze module 260.

Tracking module 240 can track at least one of the object of interest and the portion of the object of interest based in part on the data (e.g., one or more measurements and one or more determinations) generated by segmentation module 230. In some embodiments, tracking module 240 may track a binary mask including of a face or portion of a face identified by segmentation module 230. For example, where segmentation module 230 has identified a final pupil location and final iris radius within a first portion of a video stream, tracking module 240 can cooperate with location module 210 to track the pupil location and the iris radius across a second portion of the video stream. For example, in some embodiments, tracking module 240 may form a part of the face tracking module along with location module 210. Tracking module 240 can operate in cooperation with gaze module 260 to enable gaze module 260 to perform one or more operations on or with respect to the portion of the object of interest or the object of interest, as discussed in more detail below.

Gaze module 260 can receive final pupil location and final iris radius data tracked by tracking module 240 and determine a direction of gaze indicating a direction in which the eye is looking. In some embodiments, gaze module 260 can determine the direction of gaze directed at a portion NED 100. For instance, gaze module 260 can determine the direction of gaze in terms of whether the gaze is directed at the display(s) (e.g., waveguide(s)) of NED 100 or not. Gaze module 260 may detect changes in gaze, above a predetermined threshold; obstructions of a gaze; or other gaze related actions to control operations of a client device (e.g., NED 100). For example, gaze module 260 may detect a change in gaze direction above a predetermined threshold to manage power systems or subsystems of NED 100. For instance, if gaze module 260 detects that a user's gaze has moved away from the display of NED 100 (e.g., waveguide) by some predetermined threshold, that might indicate a desire or intention to power off or lower power consumption of the display (e.g., waveguide). Conversely, if gaze module 260 detects that a user's gaze is looking at the display of NED 100 (e.g., waveguide), that can indicate an intention to power on or increase power consumption of the display (e.g., waveguide). Indeed, the former scenario might indicate that the display is not being used, while the latter scenario might indicate that the display should be activated as it is needed for use.

Communication module 270 can provide various communications functionality. In some embodiments, communication module 270 can cause communication between one or more of location module 210, binarization module 220, segmentation module 230, tracking module 240, and gaze module 260.

Figure 3:
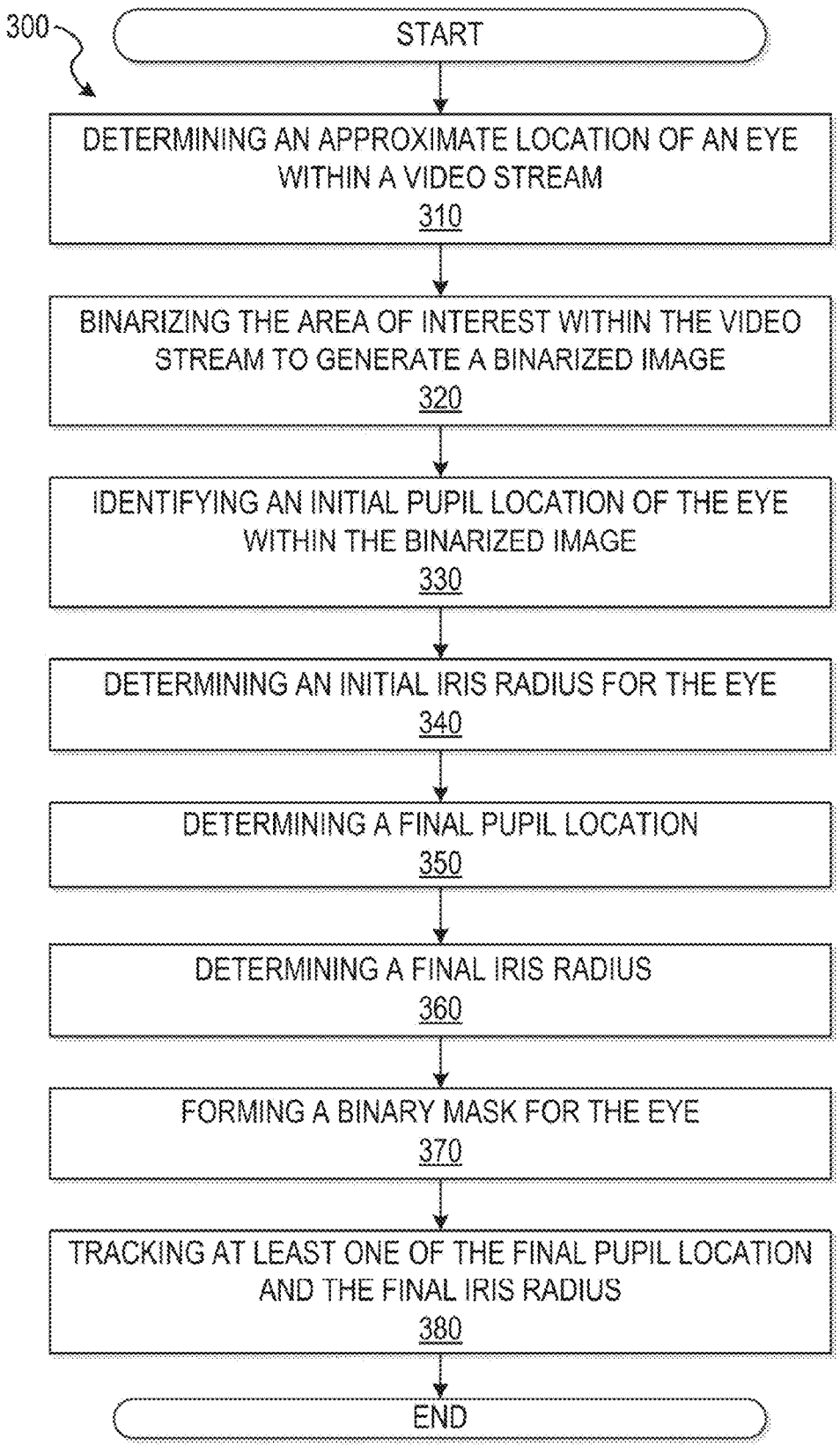
FIG. 3 is a flow diagram illustrating an example method for segmenting images within a video stream, according to some example embodiments.

FIG. 3 depicts a flow diagram illustrating an example method 300 for segmenting portions of a video stream. The operations of method 300 may be performed by components of image segmentation system 160, and are so described below for purposes of illustration.

Figure 4:
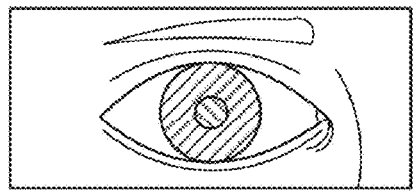
FIG. 4 illustrates an area of interest within one or more images of a video stream, according to some example embodiments.

In operation 310, location module 210 can determine an approximate location of an object of interest within a video stream including a set of images to identify an area of interest within one or more images of the set of images. For example, in some embodiments, location module 210 can determine an approximate location of an eye within the video stream, as shown in FIG. 4. Where location module 210 determines a location of one or more eyes, location module 210 can employ a set of face-tracking operations to determine one or more landmarks in a face depicted within an image and identify landmarks which represent an eye. In some instances, the area of interest may be a portion of the image extending across a portion of a width of the face, to include both eyes and a portion of the root of the nose and the bridge of the nose positioned between the eyes, and a portion of a height of the face, to include the eyes and eyelids. In some embodiments, the area of interest can include a plurality of areas of interest. For example, where location module 210 locates an approximate position of two eyes, the plurality of areas of interest may include two areas of interest with each area of interest including a portion of the one or more images sized and shaped to include an eye and eyelid. In some instances, where the area of interest includes an eye, the area of interest is rectangular in shape and formed such that the area of interest is twenty percent wider than the eye and fifty percent taller than the eye.

In some embodiments, once location module 210 identifies the area of interest or plurality of areas of interest, location module 210 can crop one or more images within the video stream. For example, location module 210 can discard, or otherwise remove from consideration and processing, portions of the one or more images in the video stream, which occur outside of the area of interest. In these embodiments, after cropping, the one or more images of the video stream may be reduced to the area of interest, or plurality of areas of interest, for further processing in method 300.

Figure 5:
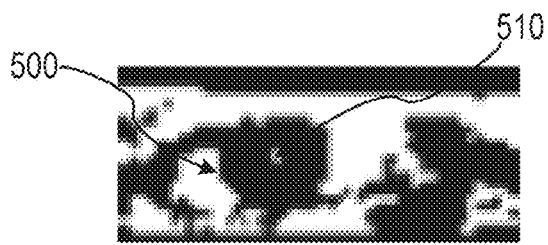
FIG. 5 illustrates a binarized image of an area of interest, according to some example embodiments.

In operation 320, binarization module 220 can binarize the area of interest within the one or more images to generate a binarized image from the video stream, as shown in FIG. 5. In various example embodiments, binarization module 220 can binarize the area of interest by determining a threshold value and assigning a first value (e.g., a value of one indicating a black pixel) to pixels which exceed the threshold and a second value (e.g., a value of zero indicating a white pixel) to pixels failing to exceed the threshold. In some embodiments, the area of interest can undergo a filtering process prior to binarization. For example, binarization module 220 may filter the area of interest to isolate the red channel. Binarization module 220 can then binarize the area of interest using the red channel of the image. In some instances, the red channel can produce suitable contrast on which to base a determination of the threshold value, such as a contrast between the white sclera of the eye and a blue or grey iris.

In various example embodiments, in operation 320, segmentation module 230 can detect an obstruction of the eye within the area of interest in one or more image within the video stream. Segmentation module 230 can identify one or more obstructed images representing images where the eye is obstructed (e.g., the iris is not identified within the area of interest but another portion of the eye is identified). Segmentation module 230 can identify one or more unobstructed images representing images where the iris of the eye is unobstructed. After segmentation module 230 identifies unobstructed and obstructed images, segmentation module can pass one or more unobstructed images to binarization module 220. In response to receiving the one or more unobstructed images, binarization module 220 can binarize the area of interest within the one or more unobstructed images to generate a binarized image from the video stream. In some embodiments, the binarized image may be a plurality of binarized images. In some instances, only the area of interest of the one or more unobstructed images is passed to binarization module 220 for binarization.

Figure 7:
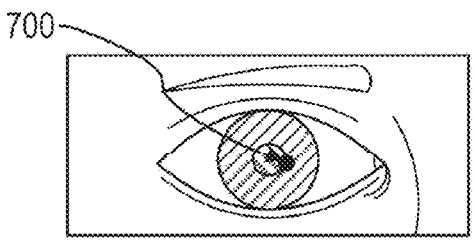
FIG. 7 illustrates a determination of an initial pupil location, according to some example embodiments.

In operation 330, segmentation module 230 can identify an initial location of a portion of the object of interest within the binarized image. For example, segmentation module 230 may identify an initial pupil location 700 of a pupil of the eye within the binarized image, as represented in FIG. 7. In some embodiments, segmentation module 230 can identify a set of first pixels within the binarized image. The set of first pixels has a first value and an area greater than a predetermined percentage of the area of interest. Segmentation module 230 can then determine an approximate center of mass of the set of first pixels. In various example embodiments, the set of first pixels can be a set of black pixels within the binarized image. For example, as shown in FIG. 5, the set of first pixels 500 can be a set of black pixels with an area greater than a predetermined percentage of the area of interest. In some instances, the set of first pixels 500 may contain pixels which are not black, such as a set of second pixels 510. Embodiments including operations for addressing the set of second pixels 510 are discussed with respect to FIG. 11.

In some embodiments, segmentation module 230 can identify the set of first pixels by determining perimeter regions within the binarized image. The perimeter regions representing a perimeter between sets of pixels with the first value (e.g., black) and with a second value (e.g., white). Segmentation module 230 may then identify areas bounded by the perimeter regions having the same value as the perimeter region. For example, segmentation module 230 may identify a perimeter region of black pixels forming a portion of a circular shape and proximate to regions of white pixels. Segmentation module 230 may identify a bounded area of black pixels within the perimeter region of black pixels. In some instances, the bounded area may represent an area within the perimeter region which has a percentage of pixels with the first value above a predetermined percentage or a predetermined threshold. Segmentation module 230 may identify the combination of pixels of the perimeter region and the bounded area with the same pixel value (e.g., black) as the set of first pixels.

After identifying the set of first pixels, segmentation module 230 may determine the approximate center of mass of the set of first pixels (e.g., the identified set of black pixels). Segmentation module 230 may calculate the center of mass using equation 1, as follows:

$$(x_{approx}, y_{approx}) = \frac{1}{|(x, y):\text{bin}(x, y) = 0|} \sum_{(x,y):bin(x,y)=0} (x, y)$$

Figure 8:
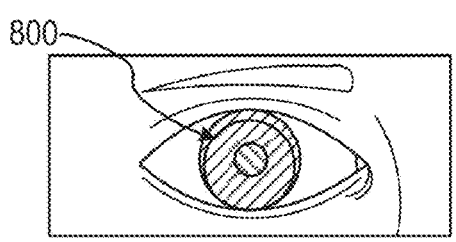
FIG. 8 illustrates a determination of an initial iris radius, according to some example embodiments.

In operation 340, segmentation module 230 can determine an initial measurement for one or more portion of the object of interest within the area of interest. For example, segmentation module 230 may determine an initial iris radius 800 for the eye, as shown in FIG. 8. In various example embodiments, to determine the initial radius for the eye, segmentation module 230 can identify a first distance from a first corner of the eye, identified within the area of interest, to a first portion of an outer edge of the iris. For example, segmentation module 230 can identify the first distance as a distance extending from a medial canthus of the eye, or proximate thereto, to a point on the outer edge of the iris located closest to the medial canthus. The segmentation module may then determine a second distance from a second corner of the eye to a second portion of the outer edge of the iris. For example, segmentation module 230 can identify the second distance as a distance extending from a lateral canthus of the eye, or proximate thereto, to a point on the outer edge of the iris located closest to the lateral canthus. After determining the first distance and the second distance, segmentation module 230 can determine the initial iris radius based on the first distance and the second distance.

In some embodiments, segmentation module 230 can also determine a total distance extending from the first corner of the eye to the second corner of the eye. For example, segmentation module 230 may determine the total distance extending from the medial canthus to the lateral canthus. In some embodiments, segmentation module 230 can determine the initial iris radius based on the first distance, the second distance, and the total distance. For example, segmentation module 230 may take the total distance and subtract the first distance and the second distance, to determine an iris distance. Segmentation module 230 may then divide the iris distance in half to generate an initial iris radius.

In some embodiments, segmentation module 230 can determine the initial iris radius based on a predetermined iris ratio. For example, segmentation module 230 may determine the initial iris radius by multiplying the total distance of the eye by 0.16 to determine the initial iris radius and center the initial iris radius at the initial pupil location.

In some embodiments, segmentation module 230 can determine a bridge distance extending between a medial canthus of a first eye and a medial canthus of a second eye. Once the iris radius, the total distance of each eye, and the bridge distance have been determined, segmentation module 230 may determine a color of the iris. Segmentation module 230 may use the total distance of each eye, the bridge distance, and iris color as biometric measurements and associate the biometric measurements with an individual. Image segmentation system 160 may later identify the individual based on a match or a substantial match, taking into account lighting and other conditions, of an individual depicted in a subsequent video stream to the biometric measurements.

Figure 9:
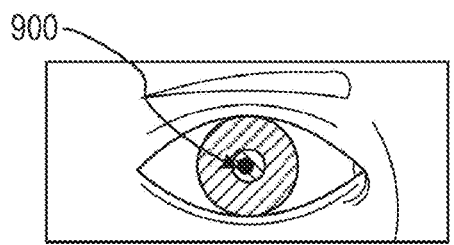
FIG. 9 illustrates a determination of a final pupil location, according to some example embodiments.

In operation 350, segmentation module 230 can determine a final location of the portion of the object of interest. For example, in some embodiments, segmentation module 230 can determine a final pupil location 900, as shown in FIG. 9. In various embodiments, to determine the final pupil location, segmentation module 230 can identify one or more locations (e.g., pixels), which are close to the initial pupil location. In some embodiments, the identified one or more locations may be identified using equation 1, shown above with respect to operation 330.

Here, segmentation module 230 can determine the one or more locations using the perimeter of the set of first pixels identified in operation 330. In some instances, segmentation module 230 can determine a set of locations using various perimeter pixels to account for variation in the shape of the set of first pixels of the binarized image. In some embodiments, segmentation module 230 can determine the one or more locations using pixels neighboring a center pixel identified at the initial pupil location. As previously discussed, the initial pupil location may be the center of mass of the set of first pixels (e.g., the set of black pixels). In these embodiments, segmentation module 230 can identify the pixels proximate to or bordering the center pixel and uses each bordering or proximate pixel as the one or more locations close to the initial pupil location.

Segmentation module 230 can evaluate the initial pupil location and the identified one or more locations with respect to the initial iris radius according to a quality function. An example quality function may be represented as equation 2, as follows:

$$quality = bp^3 * irisRadius * bg * \left(\frac{eyeWidth}{3} + distFromCenter\right)$$

The variable "bp" represents a percentage of black pixels identified within an iris shape within the area of interest of an image. "irisRadius" is the initial iris radius. "bg" is a color gradient representing an area. "eyeWidth" represents the width of the eye including the iris and the pupil being located. "distFromCenter" represents a distance of the pupil location being measured (e.g., initial pupil location or the identified one or more locations) from the center of the width of the eye.

In some embodiments, the "bg" variable, representing the color gradient, may be determined by a color change function. For example, the color change function may be represented as equation 3, as follows:

$$bg = \frac{1}{|borderPixels|} \sum_{(x,y) \in borderPixels} (im(x - \Delta x, y - \Delta y) - im(x + \Delta x, y + \Delta y))$$

As shown in equation 2, "borderPixels" may represent a set of coordinates (x, y) of all pixels which lie on a boundary of an iris shape. The variable "im(x, y)" may represent a value of a predetermined channel at a given pixel (x, y). For example, in some embodiments, as described with respect to the operation 320, the "im(x, y)" variable may represent a value for the red channel of the pixel at the given pixel. The variable "($\Delta x$, $\Delta y$)" may represent, for a given (x, y), a vector having a length below a predetermined threshold and directed towards the center of a given candidate iris location.

Within method 300, using the equation 2, "bp" represents a percentage of black pixels (e.g., the set of first pixels in operation 330). The "bp" value is calculated as a relation of a black pixel count inside the set of first pixels, identified in operation 330. As stated above, "irisRadius" is the initial iris radius. The "eyeWidth" variable may represent the total distance of the eye determined in operation 340. Segmentation module 230 may determine the "distFromCenter" from the position within the area of interest of a location being processed (e.g., the initial pupil location and the identified one or more locations) and the "eyeWidth" variable (e.g., the total distance determined in operation 340).

In the above described embodiments using equations 1, 2, and 3, segmentation module 230 can identify the location of the identified one or more locations (e.g., equation 1), and the initial pupil location which returns a highest quality value for the quality function (e.g., equation 2), with respect to a set of quality values for the other locations (e.g., the identified one or more locations and the initial pupil location).

Figure 10:
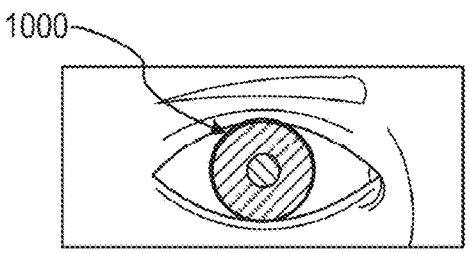
FIG. 10 illustrates a determination of a final iris location, according to some example embodiments.

In operation 360, segmentation module 230 can determine a final iris radius 1000, as shown in FIG. 10. In various example embodiments, segmentation module 230 can determine the final iris by identifying one or more radiuses for the set of first pixels identified in operation 330. In some embodiments, segmentation module 230 may use the color change function (e.g., equation 3). In some instances, the color change function may produce a set of radiuses which have varying sizes and are smaller than the set of first pixels determined in operation 330. Segmentation module 230 can identify one or more radiuses from the set of radiuses with a radius above a predetermined radius value. For example, segmentation module 230 may discard from consideration radiuses of the set of radiuses which have a value smaller than ninety percent of the initial radius. In some instances, segmentation module 230 may discard from consideration radiuses of the set of radiuses having a value smaller than the initial radius.

In some instances, operations 350 and 360 may be performed together by segmentation module 230 during calculation of equations 2 and 3. Further, in some embodiments, where performed in succession, segmentation module 230 may perform operation 360 prior to operation 350. In some situations, where segmentation module 230 performs operation 360 prior to performing operation 350, segmentation module 230 may use the final iris radius to determine the final pupil location.

In operation 370, segmentation module 230 can form a binary mask for the eye. The binary mask identifies a set of pixels associated with the iris of the eye. For example, the pixels identified in the set of first pixels may be identified as the set of pixels associated with the iris of the eye. In some instances, the binary mask is circular in shape and centered on the final pupil location. In some embodiments, the binary mask may be dynamically shaped by segmentation module 230. For example, the binary mask may initially be formed in a circular shape. Segmentation module 230 may determine a location of eyelids based on the binarized image and modify the circular shape, discarding portions of the binary mask representing portions of the iris obscured by the eyelids.

In operation 380, tracking module 240 can track at least one of the object of interest and the portion of the object of interest. For example, in some example embodiments, tracking module 240 can track at least one of the final pupil location and the final iris radius across one or more images of the video stream. The video stream may include a first portion of video stream and a second portion of video stream. The first portion of video stream may be subject to the operations of method 300 to identify and form the binary mask for the eye. Tracking module 240 receiving the binary mask as a first input, may receive the second portion of the video stream as a second input and track the binary mask (e.g., a location of pixels representing the iris of the eye) within or across one or more images included in the second portion of the video stream. In some instances, tracking module 240 may track the entire face using a facial mesh including one or more binary masks representing one or more irises depicted on the face.

Figure 11:
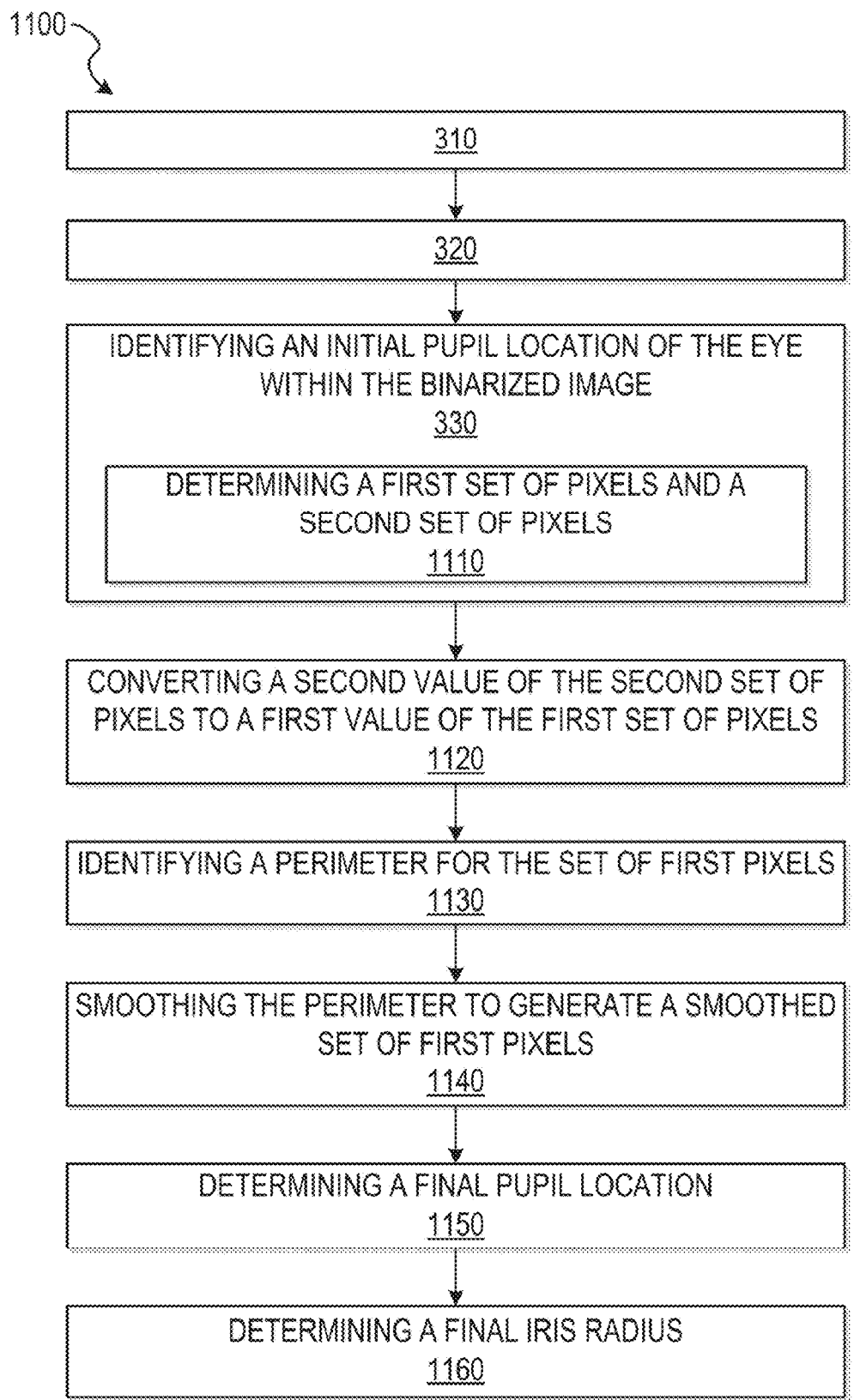
FIG. 11 is a flow diagram illustrating an example method for segmenting images within a video stream, according to some example embodiments.

FIG. 11 shows a flow diagram illustrating an example method 1100 for segmenting portions of a video stream. The operations of method 1100 may be performed by components of image segmentation system 160. In some instances, certain operations of method 1100 may be performed using one or more operations of method 300 or as sub-operations of one or more operations of method 300, as will be explained in more detail below.

In operation 1110, segmentation module 230 can determine the set of first pixels (e.g., the first pixels used in operation 330) and a set of second pixels within the binarized image. For example, as shown in FIG. 5, the set of first pixels 500 and the set of second pixels 510 can be identified within the binarized image. The set of first pixels can represent the iris and pupil of the eye within the area of interest. Further, the set of first pixels can have a first value (e.g., a value of one indicating black pixels). The set of second pixels can represent a noise region with a second value, different from the first value. The set of second pixels can be positioned within the set of first pixels. Segmentation module 230 can determine the noise region based on the area of the noise region being smaller than a predetermined percentage of the area of interest. For example, segmentation module 230 may determine the area represented by a potential noise region and compare that area to a total area of the binarized image (e.g., the binarized version of the area of interest). In some embodiments, where the area of the potential noise region is below a predetermined threshold, the area is determined to represent a noise region. Where the area of the potential noise region exceeds a predetermined threshold (e.g., an area percentage), the potential noise region is determined to represent a formation other than noise.

Figure 6:
FIG. 6 illustrates a binarized image of an area of interest, according to some example embodiments.

In operation 1120 and as depicted in FIG. 6, where the potential noise region is determined to represent a noise region, for example by falling below the predetermined threshold, segmentation module 230 can convert the second value of the set of second pixels from the noise region to the first value. As shown in FIG. 6, the converted set of second pixels may integrate into the set of first pixels 600.

In some embodiments, operations 1110 and 1120 can be performed as precursor operations prior to the operation 330. In these embodiments, the set of first pixels and the set of second pixels are identified and the set of second pixels (e.g., the noise region) are converted to the first value so as to eliminate the noise region. After a noise region, determined to be present in the set of first pixels, has been eliminated, segmentation module 230 may identify the initial pupil location of the set of first pixels. In these embodiments, after noise regions have been removed and the initial pupil location (e.g., center of mass) has been determined for the integrated set of first pixels 600, the initial iris radius may also be determined as in operation 340.

Referring again to FIG. 11, operations 1130 and 1140 may be performed as sub-operations or precursor operations to operations 350 and 360 of method 300. In operation 1130, segmentation module 230 can identify a perimeter for the set of first pixels (e.g., the set of first pixels identified in operation 330). The perimeter can include a set of perimeter pixels having a first value. In some instances, the first value for the perimeter pixels can be one, indicating that the perimeter pixels are black, within the binarized image. The perimeter pixels can act as a rough boundary representing the boundary between the iris and the sclera of the eye depicted by the binarized image.

In operation 1140, segmentation module 230 can smooth the perimeter to generate a smoothed set of first pixels. The smoothed set of first pixels may form a portion of a circular shape representing a visible portion of the iris and pupil not obstructed by the eyelids of the eye. In some embodiments, the perimeter is smoothed by modifying a value of one or more perimeter pixels of the set of perimeter pixels based on values of a set of proximate pixels.

In some instances, operation 1130 can comprise a set of sub-operations for smoothing the perimeter of the set of first pixels. For example, segmentation module 230 can identify a modification area around each pixel of the set of perimeter pixels. In some instances, the modification area can be defined as a square of pixels encircling a pixel of interest of the set of perimeter pixels. Segmentation module 230 can then identify a value associated with each pixel of the modification area. Where a portion, exceeding a predetermined threshold, of the pixels within the modification area share the same value and the value of the pixel of interest differs from the value of the portion of the pixels, segmentation module 230 can modify the value of the pixel of interest to match the value of the portion of the pixels. For example, in some embodiments, the modification area may be divided into nine pixels. Where the pixel of interest has a value of zero and five of the pixels of the modification area have a value of one, segmentation module 230 may modify the value of the pixel of interest to a value of one. Segmentation module 230 may continue modifying pixels within the set of perimeter pixels until the smoothed set of first pixels forms at least a portion of a circular shape. For example, the smoothed set of first pixels may approach a portion of a circular shape representing and resembling a visible portion of the iris.

In operation 1150, segmentation module 230 can determine the final pupil location based on the smoothed set of first pixels. For example, in some embodiments, operation 1150 can be performed similarly to the operation 350 where the "irisRadius" variable of equation 2 is a radius of the smoothed set of first pixels and the "bg" variable represents an area of the smoothed set of first pixels.

In operation 1160, segmentation module 230 can determine the final iris radius based on the smoothed set of first pixels. For example, in some embodiments, operation 1140 can be performed similarly to the operation 360 where the segmentation module 230 uses the color change function (e.g., equation 3) on the smoothed set of first pixels.

Figure 12:
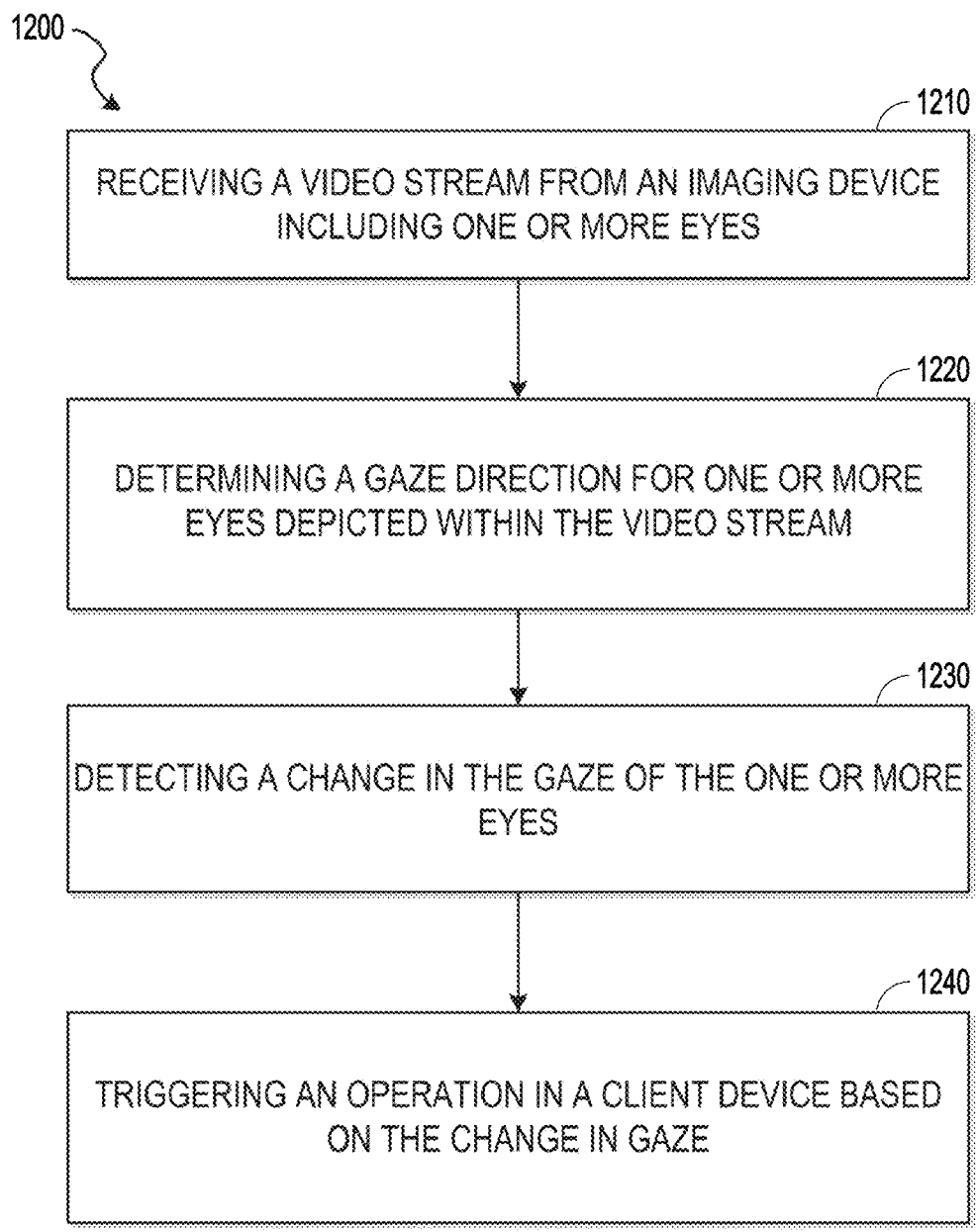
FIG. 12 is a flow diagram illustrating an example method for controlling one or more operations of the client device using image segmentation operations, according to some example embodiments.

FIG. 12 depicts a flow diagram illustrating an example method 1200 for controlling one or more operations of a client device via one or more functions of image segmentation system 160. The operations of method 1200 may be performed by components of image segmentation system 160. In some instances, certain operations of method 1200 may be performed using one or more operations of methods 300 and/or 1100, in one or more of the described embodiments, or as sub-operations of one or more operations of methods 300 and/or 1100, as will be explained in more detail below.

In operation 1210, location module 210 can receive a video stream from an imaging device coupled to the client device (e.g., NED 100). In an example, the video stream can come from the one or more eye-facing cameras of NED 100, which can capture video of a user's eyes while using NED 100. In some embodiments, the video stream includes one or more eyes positioned to view a display device (e.g., waveguide) coupled to the client device (e.g., NED 100). Location module 210, binarization module 220, and segmentation module 230 can perform one or more operations as described in methods 300 or 1100. Segmentation module 230 may generate a binary mask indicative of pixels representing an object of interest depicted within one or more images of the video stream.

In operation 1220, gaze module 260 can determine a gaze direction for one or more eyes depicted within the video stream. The gaze direction may represent an object or area of the display device at which the one or more eyes are directed. For instance, the gaze direction can represent an area of interest in the form of the display (e.g., waveguide) of NED 100. In some embodiments, gaze module 260 can determine the gaze direction for the one or more eyes by identifying a location of the eye relative to the imaging device and the display device, forming a triangle extending between the imaging device, the display device, and the one or more eyes. Gaze module 260 may receive the final pupil location from the binary mask, as determined by segmentation module 230.

After determining the location of the one or more eyes in space proximate to the client device (e.g., NED 100), gaze module 260 can determine the gaze direction by calculating a line of sight extending from the one or more eye to the display device. In some embodiments, the line of sight can be represented by a cone extending from the one or more eye (e.g., a vertex of the cone) to the display device (e.g., a base of the cone). The radius of the cone and the slant height of the cone may be determined by gaze module 260 based on the location of the one or more eyes and an angle of the line of sight (e.g., a line extending from the center of mass of the set of first pixels to the display device). In various embodiments, after determining the gaze direction, gaze module 260 may automatically monitor the gaze direction across one or more images within the video stream captured by the imaging device of the client device (e.g., NED 100).

In operation 1230, gaze module 260 can detect a change in the gaze of the one or more eyes, based on the monitoring of the gaze within the video stream. For example, gaze module 260 may determine a change in the gaze direction based on a movement of the one or more eyes. In some instances, gaze module 260 can register the change in the gaze direction when the calculated gaze direction changes by a value exceeding a predetermined gaze threshold. For example, the predetermined gaze threshold may be a distance equal to a percentage of a viewable area of the display device (e.g., waveguide). In these instances, for example, gaze module 260 may detect the change in gaze direction when the line of sight moves a distance along the display device of anywhere between about five to twenty-five percent of the viewable area of the display device.

In operation 1240, gaze module 260 can trigger an operation in the client device (e.g., NED 100). For example, gaze module 260, determining a change in the gaze of the one or more eyes, can cause certain power-management systems or sub-systems of NED 100 to alter their output. As an example, gaze module 260 can determine that a change in the gaze of one or more eyes has resulted in a user looking away from the display (e.g., waveguide) of the client device (e.g., NED 100). In such an instance, gaze module 260 can cause power consumption of the display to decrease (e.g., by placing the display in a sleep mode). In another example, gaze module 260 can shut off certain areas of the display to lower the power consumption thereof. For instance, gaze module 260 can turn off certain pixels with an array of pixels on the display (e.g., waveguide) to lower power consumption of the display when gaze module 260 determines that a user's eyes are looking away from the display. As another example, gaze module 260 can determine that a change in the gaze of one or more eyes has resulted in a user looking at the display (e.g., waveguide) of the client device (e.g., NED 100). In such an instance, gaze module 260 can cause power consumption of the display to increase (e.g., by placing the display in a wake mode). In another example, gaze module 260 can turn on certain areas of or the entire display to increase the power consumption thereof and make the display (e.g., waveguide) ready for use. For instance, gaze module 260 can turn on certain pixels with an array of pixels on the display (e.g., waveguide) to increase power consumption of the display and make the display ready for use when gaze module 260 determines that a user's eyes are looking at the display. As such, the present disclosure contemplates mechanisms and methods for effectively power management for display systems using the eye-tracking methodologies set forth above. Such power-management solutions can be particularly effective in NEDs since the displays (e.g., waveguide) of such head-worn devices can be notoriously power-consumptive.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Software Architecture

Figure 13:
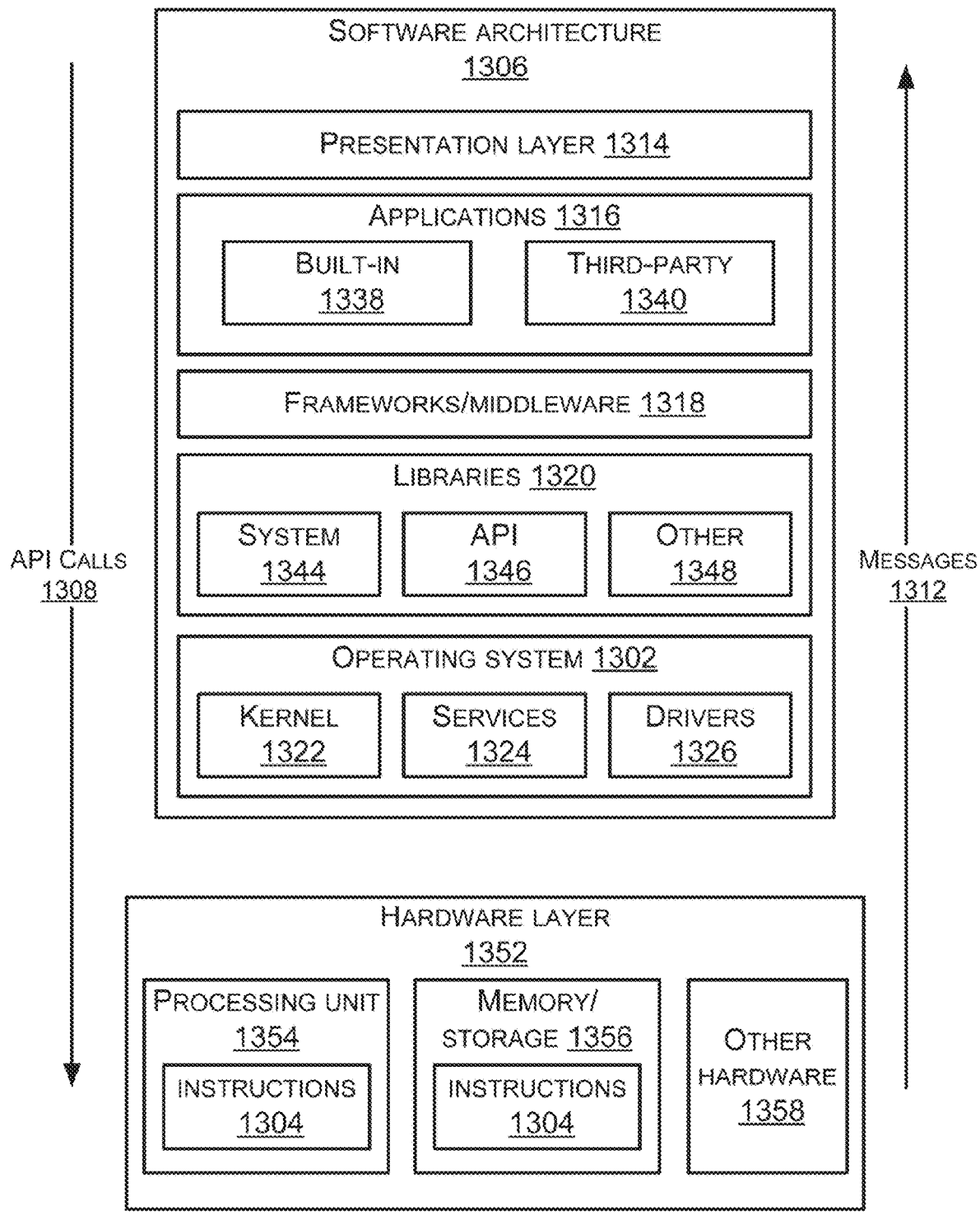
FIG. 13 is a block diagram illustrating a representative software architecture, which can be used in conjunction with various hardware architectures described herein.

FIG. 13 is a block diagram illustrating an example software architecture 1306, which can be used in conjunction with various hardware architectures herein described. FIG. 13 is a non-limiting example of a software architecture and it will be appreciated that many other architectures can be implemented to facilitate the functionality described herein. Software architecture 1306 can execute on hardware such as machine 1400 of FIG. 14 that includes, among other things, processors 1404, memory 1414, and I/O components 1418. A representative hardware layer 1352 is illustrated and can represent, for example, in machine 1400 of FIG. 14. Representative hardware layer 1352 can include a processing unit 1354 having associated executable instructions 1304. Executable instructions 1304 can represent the executable instructions of the software architecture 1306, including implementation of the methods, components and so forth described herein. Hardware layer 1352 can also include memory and/or storage modules memory/storage 1356, which can also have executable instructions 1304. Hardware layer 1352 can also comprise other hardware 1358.

In the example architecture of FIG. 13, software architecture 1306 can be conceptualized as a stack of layers where each layer can provide particular functionality. For example, software architecture 1306 can include layers such as an operating system 1302, libraries 1320, applications 1316 and a presentation layer 1314. Operationally, the applications 1316 and/or other components within the layers may invoke application programming interface (API) calls 1308 through the software stack and receive a response as in response to API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

Operating system 1302 can manage hardware resources and provide common services. Operating system 1302 can include, for example, a kernel 1322, services 1324 and drivers 1326. Kernel 1322 can act as an abstraction layer between the hardware and the other software layers. For example, kernel 1322 can be responsible for memory management, processor management (e.g., scheduling), component management, networking, security settings, and so on. Services 1324 can provide other common services for the other software layers. Drivers 1326 can be responsible for controlling or interfacing with the underlying hardware. For instance, drivers 1326 can include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

Libraries 1320 can provide a common infrastructure that is used by the applications 1316 and/or other components and/or layers. Libraries 1320 can provide functionality that allows other software components to perform tasks in an easier fashion than to interface directly with the underlying operating system 1302 functionality (e.g., kernel 1322, services 1324 and/or drivers 1326). Libraries 1320 can include system libraries 1344 (e.g., C standard library) that can provide functions such as memory allocation functions, string manipulation functions, mathematical functions, and the like. In addition, libraries 1320 can include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. Libraries 1320 can also include a wide variety of other libraries 1348 to provide many other APIs to the applications 1316 and other software components/modules.

Frameworks/middleware 1318 (also sometimes referred to as middleware) can provide a higher-level common infrastructure that may be used by the applications 1316 and/or other software components/modules. For example, frameworks/middleware 1318 can provide various graphic user interface (GUI) functions, high-level resource management, high-level location services, and so forth. Frameworks/middleware 1318 can provide a broad spectrum of other APIs that may be utilized by applications 1316 and/or other software components/modules, some of which may be specific to a particular operating system 1302 or platform.

Applications 1316 can include built-in applications 1338 and/or third-party applications 1340. Examples of representative built-in applications 1338 can include, but are not limited to, a contacts application, a browser application, a book reader application, a location application, a media application, a messaging application, and/or a game application. Third-party applications 1340 can include an application developed using the ANDROID™ or IOS™ software development kit (SDK) by an entity other than the vendor of the particular platform, and can be mobile software running on a mobile operating system such as IOS™, ANDROID™ WINDOWS® Phone, or other mobile operating systems. Third-party applications 1340 can invoke the API calls 1308 provided by the mobile operating system (such as operating system 1302) to facilitate functionality described herein.

Applications 1316 can use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
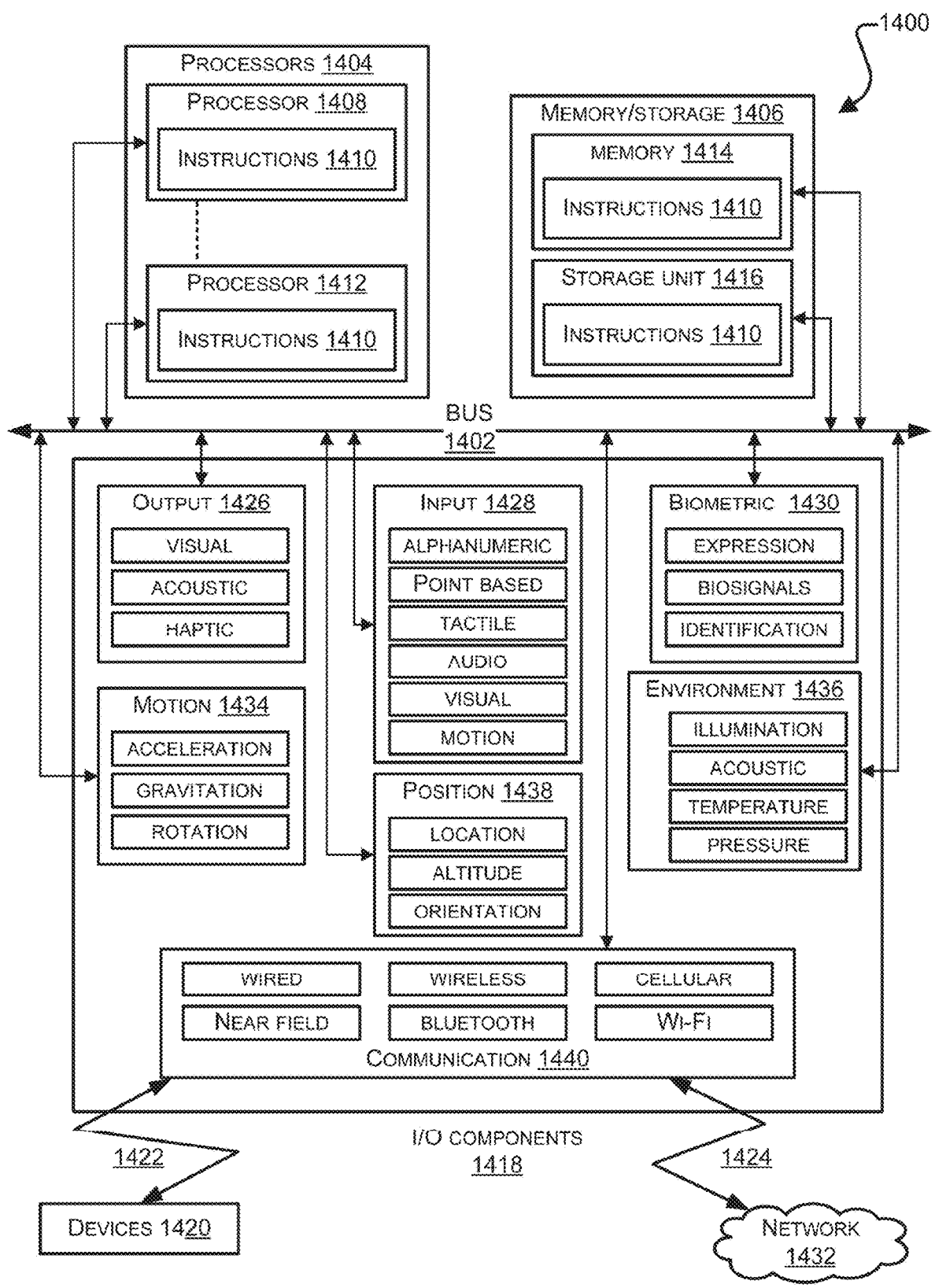
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of machine 1400 in the example form of a computer system, within which instructions 1410 (e.g., software, a program, an application, an applet, an app, or other executable code) for causing the machine 1400 to perform any one or more of the methodologies discussed herein may be executed. As such, instructions 1410 can be used to implement modules or components described herein. Instructions 1410 transform the general, non-programmed machine 1400 into a particular machine 1400 programmed to carry out the described and illustrated functions in the manner described. In alternative embodiments, machine 1400 operates as a standalone device or can be coupled (e.g., networked) to other machines. In a networked deployment, machine 1400 can operate in the capacity of a server machine or a client machine in a server-client network environment, or as a peer machine in a peer-to-peer (or distributed) network environment. Machine 1400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

Machine 1400 can include processors 1404, memory memory/storage 1406, and I/O components 1418, which can be configured to communicate with each other such as via a bus 1402. Memory/storage 1406 may include a memory 1414, such as a main memory, or other memory storage, and a storage unit 1416, both accessible to processors 1404 such as via bus 1402. Storage unit 1416 and memory 1414 can store instructions 1410 embodying any one or more of the methodologies or functions described herein. Instructions 1410 can also reside, completely or partially, within memory 1414, within the storage unit 1416, within at least one of processors 1404 (e.g., within the processor's cache memory), or any suitable combination thereof, during execution thereof by machine 1400. Accordingly, memory 1414, storage unit 1416, and the memory of processors 1404 can be examples of machine-readable media.

I/O components 1418 can include a wide variety of components to receive input, provide output, produce output, transmit information, exchange information, capture measurements, and so on. The specific I/O components 1418 that can be included in a particular machine 1400 will depend on the type of machine. For example, portable machines such as mobile phones can likely include a touch input device or other such input mechanisms, while a headless server machine can likely not include such a touch input device. It will be appreciated that I/O components 1418 can include many other components that are not shown in FIG. 14. I/O components 1418 can be grouped according to functionality merely for simplifying the following discussion and the grouping is in no way limiting. In various example embodiments, I/O components 1418 can include output components 1426 and input components 1428. Output components 1426 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 1428 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, I/O components 1418 can include biometric components 1430, motion components 1434, environmental environment components 1436, or position components 1438 among a wide array of other components. For example, biometric components 1430 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Motion components 1434 can include acceleration sensor components (e.g., accelerometer), gravitation sensor components, rotation sensor components (e.g., gyroscope), and so forth. Environment components 1436 can include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. Position components 1438 can include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication can be implemented using a wide variety of technologies. I/O components 1418 can include communication components 1440 operable to couple machine 1400 to a network 1432 or devices 1420 via coupling 1422 and coupling 1424 respectively. For example, communication components 1440 can include a network interface component or other suitable device to interface with network 1432.

In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. Devices 1420 can be another machine or any of a wide variety of peripheral devices (e.g., a peripheral device coupled via a Universal Serial Bus (USB)).

Moreover, communication components 1440 can detect identifiers or include components operable to detect identifiers. For example, communication components 1440 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via communication components 1440, such as, location via Internet Protocol (IP) geo-location, location via Wi-Fi® signal triangulation, location via detecting a NFC beacon signal that can indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Alternate Embodiments

It will be readily understood to those skilled in the art that various other changes in the details, material, and arrangements of the parts and method stages which have been described and illustrated in order to explain the nature of the inventive subject matter can be made without departing from the principles and scope of the inventive subject matter as expressed in the subjoined claims. For example, the order of method steps or stages can be altered from that described above, as would be appreciated by a person of skill in the art. As another example, while a particular implementation of an eye-tracking mechanism and method has been described herein, it is contemplated that other eye-tracking mechanisms and methods can be utilized with the disclosure, including specifically the power-management operations thereof.

It will also be appreciated that the various dependent claims, examples, and the features set forth therein can be combined in different ways than presented above and/or in the initial claims. For instance, any feature(s) from the above examples can be shared with others of the described examples, and/or a feature(s) from a particular dependent claim may be shared with another dependent or independent claim, in combinations that would be understood by a person of skill in the art.

What is claimed is:
1. A display system comprising:
a display;
an eye-tracking sensor; and
a processor communicatively coupled to the display and the eye-tracking sensor, the processor configured to perform operations comprising:
  receiving eye-tracking data from the eye-tracking sensor;
  determining whether a user's eye is looking at the display based on a pupil location of the user's eye, the pupil location being determined by:
    determining an proximate location of the user's eye within a video stream provided by the eye-tracking data;
    determining an area of interest in the video stream;

binarizing the area of interest to generate a binarized image;
determining an iris radius by:
identifying a set of pixels within the binarized image;
identifying a set of radiuses for the set of pixels; and
identifying the iris radius from the set of radiuses based on a predetermined radius value; and
determining the pupil location based on the iris radius; and
controlling a power consumption of the display based on whether the user's eye is determined to be looking at the display.

2. The display system of claim 1, wherein the eye-tracking sensor comprises a camera, and the eye-tracking data is a video of the user's eye.

3. The display system of claim 1, wherein controlling the power consumption of display based on whether the user's eye is determined to be looking at the display comprises: causing the power consumption of the display to decrease by setting the display in a low-power mode when the user's eye is determined not to be looking at the display.

4. The display system of claim 1, wherein controlling the power consumption of display based on whether the user's eye is determined to be looking at the display comprises:
causing the power consumption of the display to increase by setting the display in a high-power mode when the user's eye is determined to be looking at the display.

5. The display system of claim 1, wherein controlling the power consumption of display based on whether the user's eye is determined to be looking at the display comprises:
powering off at least one area of the display when the user's eye is determined not to be looking at the display.

6. The display system of claim 1, wherein controlling the power consumption of display based on whether the user's eye is determined to be looking at the display comprises:
reducing an intensity of a subset of pixels of the display to reduce the power consumption of the display when the user's eye is determined not to be looking at the display.

7. The display system of claim 1, wherein the display is included in a lens of an eyewear device.

8. The display system of claim 7, wherein the display is a waveguide.

9. A non-transitory computer-readable storage medium having stored thereon, instructions when executed by a processor, causes the processor to perform operations of a method, the operations comprising:
receiving eye-tracking data from an eye-tracking sensor;
determining whether a user's eye is looking at a display based on a pupil location of the user's eye, the pupil location being determined by:
determining an proximate location of the user's eye within a video stream provided by the eye-tracking data;
determining an area of interest in the video stream;
binarizing the area of interest to generate a binarized image;
determining an iris radius based by:
identifying a set of pixels within the binarized image;
identifying a set of radiuses for the set of pixels; and
identifying the iris radius from the set of radiuses based on a predetermined radius value; and
determining the pupil location based on the iris radius; and
controlling a power consumption of the display based on whether the user's eye is determined to be looking at the display.

10. The non-transitory computer-readable storage medium of claim 9, wherein the eye-tracking sensor comprises a camera, and the eye-tracking data is a video of the user's eye.

11. The non-transitory computer-readable storage medium of claim 9, wherein controlling the power consumption of display based on whether the user's eye is determined to be looking at the display comprises:
causing the power consumption of the display to decrease by setting the display in a low-power mode when the user's eye is determined not to be looking at the display.

12. The non-transitory computer-readable storage medium of claim 9, wherein controlling the power consumption of display based on whether the user's eye is determined to be looking at the display comprises:
causing the power consumption of the display to increase by setting the display in a high-power mode when the user's eye is determined to be looking at the display.

13. The non-transitory computer-readable storage medium of claim 9, wherein controlling the power consumption of display based on whether the user's eye is determined to be looking at the display comprises:
powering off at least one area of the display when the user's eye is determined not to be looking at the display.

14. The non-transitory computer-readable storage medium of claim 9, wherein controlling the power consumption of display based on whether the user's eye is determined to be looking at the display comprises:
reducing an intensity of a subset of pixels of the display to reduce the power consumption of the display when the user's eye is determined not to be looking at the display.

15. The non-transitory computer-readable storage medium of claim 9, wherein the display is included in a lens of an eyewear device.

16. The non-transitory computer-readable storage medium of claim 15, wherein the display is a waveguide.

17. A method comprising:
receiving eye-tracking data from an eye-tracking sensor;
determining whether a user's eye is looking at a display based on a pupil location of the user's eye, the pupil location being determined by:
determining an proximate location of the user's eye within a video stream provided by the eye-tracking data;
determining an area of interest in the video stream;
binarizing the area of interest to generate a binarized image;
determining an iris radius by:
identifying a set of pixels within the binarized image;
identifying a set of radiuses for the set of pixels; and
identifying the iris radius from the set of radiuses based on a predetermined radius value; and
determining the pupil location based on the iris radius; and
controlling a power consumption of the display based on whether the user's eye is determined to be looking at the display.

18. The method of claim 17, wherein the eye-tracking sensor comprises a camera.

19. The method of claim 17, wherein the eye-tracking sensor comprises a camera, and the eye-tracking data is a video of the user's eye.

20. The method of claim 17, wherein controlling the power consumption of display based on whether the user's eye is determined to be looking at the display comprises:
   causing the power consumption of the display to decrease by setting the display in a low-power mode when the user's eye is determined not to be looking at the display.

* * * * *

UNITED STATES PATENT AND TRADEMARK OFFICE
CERTIFICATE OF CORRECTION

| | |
|---|---|
| PATENT NO. | : 11,681,365 B2 |
| APPLICATION NO. | : 17/473020 |
| DATED | : June 20, 2023 |
| INVENTOR(S) | : Yu Jiang Tham |

It is certified that error appears in the above-identified patent and that said Letters Patent is hereby corrected as shown below:

In the Claims

In Column 24, Line 64, in Claim 1, delete "proximate" and insert --approximate-- therefor In Column 25, Line 55, in Claim 9, delete "proximate" and insert --approximate-- therefor In Column 25, Line 61, in Claim 9, after "radius", delete "based"

In Column 26, Line 50, in Claim 17, delete "proximate" and insert --approximate-- therefor Signed and Sealed this
Fifteenth Day of October, 2024

Katherine Kelly Vidal
*Director of the United States Patent and Trademark Office*